(12) United States Patent
Edwards et al.

(10) Patent No.: US 10,298,706 B2
(45) Date of Patent: May 21, 2019

(54) SOCIAL MEDIA AND LOCATION-BASED INFORMED ENTERTAINMENT RECOMMENDATIONS

(71) Applicant: AT&T INTELLECTUAL PROPERTY I, L.P., Atlanta, GA (US)

(72) Inventors: Gregory W. Edwards, Austin, TX (US); Sarah Everett, Cedar Park, TX (US); Marc Sullivan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 263 days.

(21) Appl. No.: 15/437,254

(22) Filed: Feb. 20, 2017

(65) Prior Publication Data

US 2018/0241829 A1    Aug. 23, 2018

(51) Int. Cl.
| | |
|---|---|
| *G06F 15/16* | (2006.01) |
| *H04L 29/08* | (2006.01) |
| *H04W 4/02* | (2018.01) |
| *H04W 8/18* | (2009.01) |

(52) U.S. Cl.
CPC .............. *H04L 67/22* (2013.01); *H04W 4/02* (2013.01); *H04W 8/18* (2013.01)

(58) Field of Classification Search
None
See application file for complete search history.

(56) References Cited

U.S. PATENT DOCUMENTS

| | | |
|---|---|---|
| 8,510,247 B1 | 8/2013 | Killalea et al. |
| 8,886,584 B1 | 11/2014 | Kane, Jr. et al. |
| 9,141,960 B2 | 9/2015 | Feldman et al. |
| 2013/0246520 A1 | 9/2013 | Belvin et al. |
| 2013/0275417 A1 | 10/2013 | Fernandes et al. |
| 2014/0032358 A1* | 1/2014 | Perkowitz ............... H04W 4/21 705/26.7 |

(Continued)

OTHER PUBLICATIONS

"Predicting Personality with Social Media", Submitted for review to CHI, 2011, 10 pages.

(Continued)

*Primary Examiner* — Phyllis A Book
(74) *Attorney, Agent, or Firm* — Guntin & Gust, PLC; Atanu Das

(57) ABSTRACT

Aspects of the subject disclosure may include, for example, a method comprising: obtaining social media information associated with a user, wherein the social media information comprises historical social media information associated with the user and current social media information associated with the user; selecting, based upon the historical social media information, a selected personality type associated with the use; determining, based upon the selected personality type associated with the user, a candidate entertainment recommendation; determining, based upon the current social media information, whether the candidate entertainment recommendation should be provided to the user; responsive to determining that the candidate entertainment recommendation should not be provided to the user: determining, based upon the selected personality type associated with the user, an alternate entertainment recommendation; and providing to the user the second recommendation. Other embodiments are disclosed.

20 Claims, 9 Drawing Sheets

(56) References Cited

U.S. PATENT DOCUMENTS

| | | | |
|---|---|---|---|
| 2014/0032452 A1* | 1/2014 | Perkowitz | H04W 4/21 706/12 |
| 2014/0129634 A1 | 5/2014 | Kim et al. | |
| 2014/0244742 A1 | 8/2014 | Yu et al. | |
| 2014/0337254 A1 | 11/2014 | Chen et al. | |
| 2014/0337267 A1 | 11/2014 | Karamchedu et al. | |
| 2015/0127565 A1* | 5/2015 | Chevalier | G06Q 10/00 705/319 |
| 2015/0281163 A1 | 10/2015 | Bastide et al. | |
| 2015/0294377 A1* | 10/2015 | Chow | G06Q 30/0263 705/347 |
| 2016/0078489 A1 | 3/2016 | Hu et al. | |
| 2016/0098640 A1* | 4/2016 | Su | G06N 5/04 706/50 |
| 2016/0117595 A1 | 4/2016 | Zhang et al. | |
| 2016/0127485 A1 | 5/2016 | Tseng et al. | |
| 2016/0189042 A1 | 6/2016 | Gill et al. | |
| 2016/0227283 A1 | 8/2016 | Kelly et al. | |
| 2016/0232137 A1* | 8/2016 | Liu | G06F 17/2235 |
| 2016/0255163 A1* | 9/2016 | Stathacopoulos | H04L 51/14 709/224 |
| 2016/0275186 A1 | 9/2016 | Wansley et al. | |
| 2017/0228114 A1* | 8/2017 | Brett | G06F 17/30867 |
| 2017/0235838 A1* | 8/2017 | Shaw | G06F 17/30867 707/706 |

OTHER PUBLICATIONS

Rentfrow, Peter J., "Listening, Watching, and Reading: The Structure and Correlates of Entertainment Preferences", Journal of Personality, Wiley Periodicals, Inc., 2010, 35 pages.

* cited by examiner

100

150

200

300

340

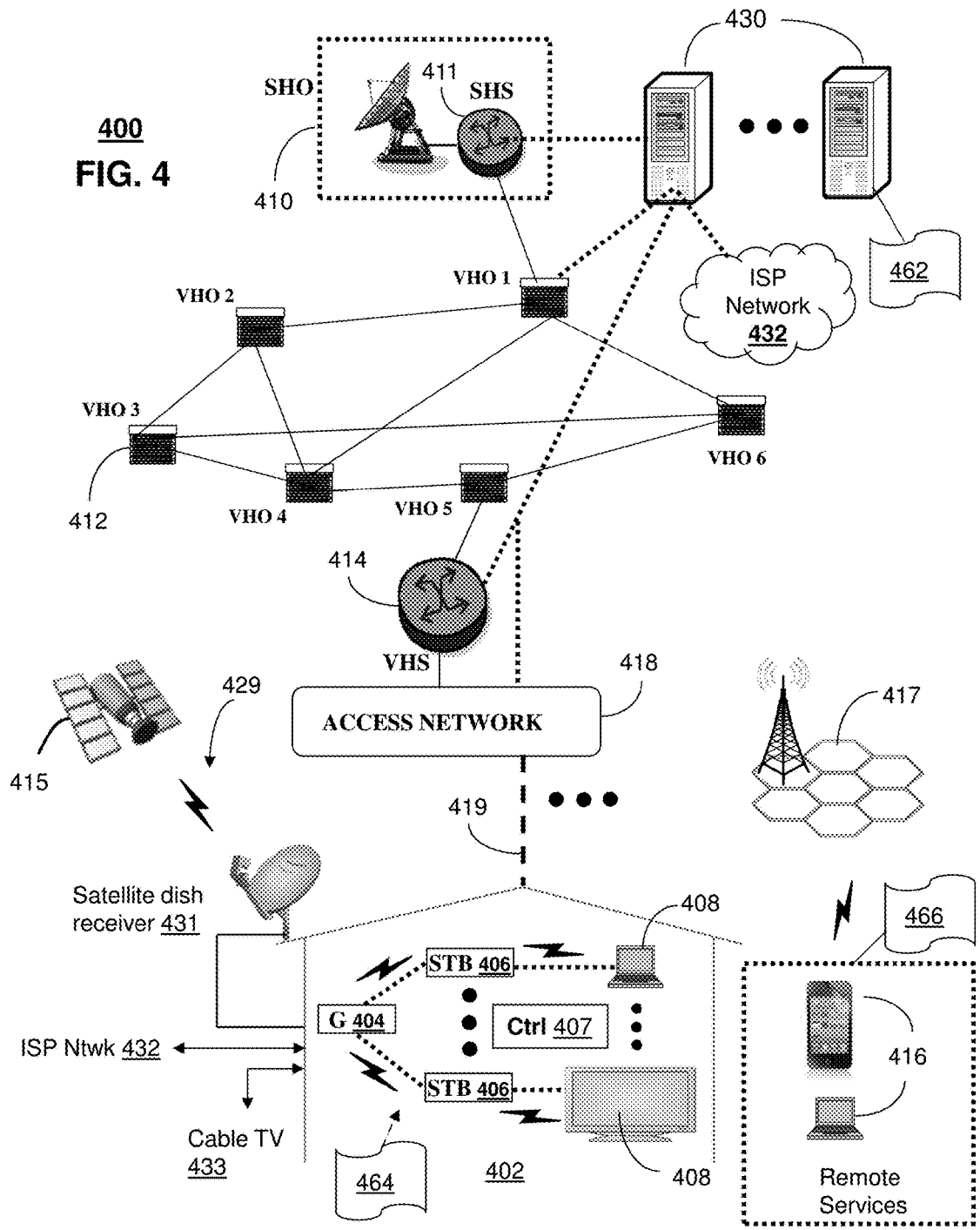

SOCIAL MEDIA AND LOCATION-BASED INFORMED ENTERTAINMENT RECOMMENDATIONS

FIELD OF THE DISCLOSURE

The subject disclosure relates to social media and location-based recommendations (e.g., entertainment recommendations).

BACKGROUND

Social networking systems have utilized location data to provide various recommendations to a user.

BRIEF DESCRIPTION OF THE DRAWINGS

Reference will now be made to the accompanying drawings, which are not necessarily drawn to scale, and wherein:

FIG. 4 depicts an illustrative embodiment of a communication system that provides media services related recommendations (e.g., entertainment recommendations) based upon social media, location and/or personality types such as described in connection with FIGS. 1A-1B and 2;

DETAILED DESCRIPTION

The subject disclosure describes, among other things, illustrative embodiments for providing recommendations (e.g., entertainment recommendations) based upon social media, location and/or personality types. Other embodiments are described in the subject disclosure.

One or more aspects of the subject disclosure include providing entertainment recommendations based upon: (a) social media information from a social media network; (b) location information; and/or (c) personality type information. The entertainment recommendations may be to receive certain media content (e.g., video content such as a particular television show or particular music) or for a certain activity (e.g., going to a particular movie theater to see a particular movie, going to the park to meet a friend, going rock climbing).

Figure 1A:
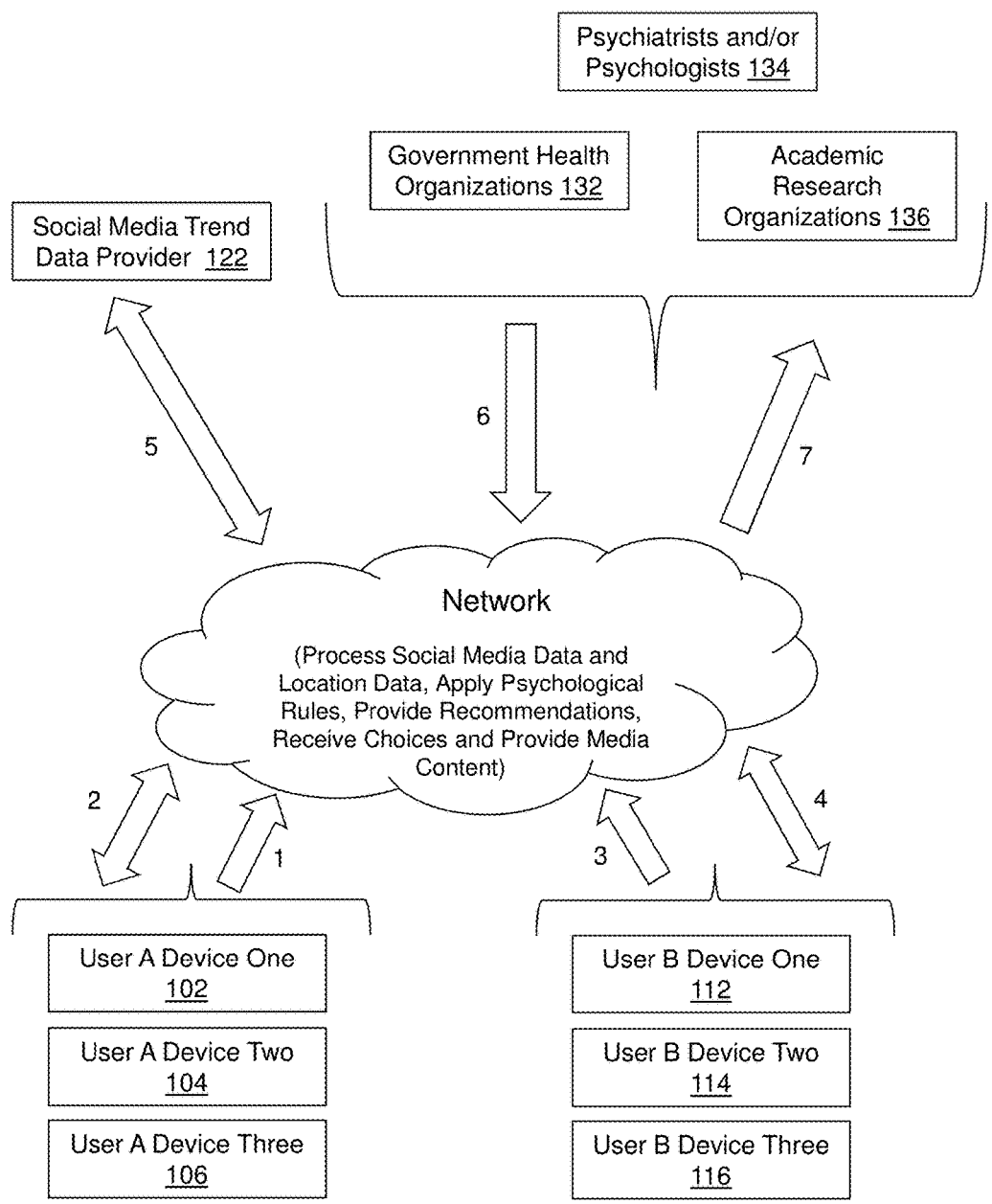
FIG. 1A depicts an illustrative embodiment of a system for providing recommendations (e.g., entertainment recommendations) based upon social media, location and/or personality types.

FIG. 1A depicts an illustrative embodiment of a system for providing recommendations (e.g., entertainment recommendations) based upon social media, location and/or personality types. As seen in FIG. 1A, a user "A" (not shown) has three devices 102, 104 and 106 that are configured for bi-directional communication with a network (e.g. comprising the Internet). Each of these devices may comprise, for example, a smartphone, a tablet, a laptop computer and/or a desktop computer. Each of these devices may be used for social media interaction (e.g., post uploading, comment uploading, post viewing, comment viewing) and/or location tracking (e.g., via GPS and/or network-based techniques). Of course, while three devices associated with user "A" are shown, any desired number of devices may be utilized by user "A". Further, user "B" (not shown) has three devices 112, 114 and 116 that are configured for bi-directional communication with the network. Each of these devices may comprise, for example, a smartphone, a tablet, a laptop computer and/or a desktop computer. Each of these devices may be used for social media interaction (e.g., post uploading, comment uploading, post viewing, comment viewing) and/or location tracking (e.g., via GPS and/or network-based techniques). Of course, while three devices associated with user "B" are shown, any desired number of devices may be utilized by user "B".

Still referring to FIG. 1A, a social media trend data provider 122 is configured for bi-directional communication with the network. This social media trend data provider 122 may provide (for example, in response to a request) various trend data that is indicative of one or more trends on one or more social media networks. In one specific example, the trend data may indicate a particular subject on one or more social media networks that is of high current interest (such as evidenced by many posts and/or comments). Further, government health organizations 132, psychiatrists and/or psychologists 134 and research organizations 136 (sometimes collectively referred to herein as "psychological data sources" are configured for bi-directional communication with the network. The psychological data sources may provide to the network various psychological data (e.g., related to behavior and/or personality types) and may receive back data indicative of entertainment recommendations and/or entertainment activity (e.g., which activities were recommended to and/or engaged in by various people exhibiting various behavior and/or personality types).

In operation, one or more of user "A" devices 102, 104, 106 may provide to the network (see arrow "1") location data (e.g., a distinct location associated with each device 102, 104, 106) and/or may utilize the network for social media interaction (e.g., post uploads, comment uploads). Further, one or more of user "A" devices 102, 104, 106 may receive (see arrow "2") from the network one or more entertainment recommendations and may provide back to the network (see arrow "2") one or more entertainment selections (these selections may be provided back to the network in response to the recommendations). Further still, one or more of user "A" devices 102, 104, 106 may receive (see arrow "2") a media content item from the network. The media content item(s) may be sent in response to the selection(s). In one specific example, device one 102 may receive a first recommendation to watch a broadcast movie and a second recommendation to watch a broadcast sporting event; the user "A" may then send back from device one 102 to the network a message selecting the television show; the network may then send back the selected television show (e.g., via streaming or download) to device one 102. In another specific example each of, devices 102, 104, 106 may have installed thereon an "app" to carry out the functions described herein.

Still referring to FIG. 1A, one or more of user "B" devices 112, 114, 116 may provide to the network (see arrow "3") location data (e.g., a distinct location associated with each device 112, 114, 116) and/or may utilize the network for social media interaction (e.g., post uploads, comment uploads). Further, one or more of user "B" devices 112, 114, 116 may receive (see arrow "4") from the network one or more entertainment recommendations and may provide back to the network (see arrow "4") one or more entertainment selections (these selections may be provided back to the network in response to the recommendations). Further still, one or more of user "B" devices 112, 114, 116 may receive (see arrow "4") a media content item from the network. The media content item(s) may be sent in response to the selection(s). In one specific example, device three 116 may receive a first recommendation to watch a broadcast movie and a second recommendation to watch a broadcast concert; the user "B" may then send back from device three 116 to the network a message selecting the concert; the network may then send back the selected concert (e.g., via streaming or download) to device three 116. In another specific example, each of devices 112, 114, 116 may have installed thereon an "app" to carry out the functions described herein.

Still referring to FIG. 1A social media trend data provider 122 may provide various social media trend data (see arrow "5") for use in making entertainment recommendations as described herein. In one example, the social media trend data may be provided in response to a request made to social media trend data provider 122 (see arrow "5"). In addition, government health organizations 132, psychiatrists and/or psychologists 134 and research organizations 136 may provide (see arrow "6") various behavior and/or personality type data (e.g., psychological information, profiles and/or guidelines) for use in making entertainment recommendations as described herein. Moreover, government health organizations 132, psychiatrists and/or psychologists 134 and research organizations 136 may receive (see arrow "7") various data (e.g., that has been aggregated and/or made anonymous) with respect to the entertainment recommendations and selections (and how such entertainment recommendations and selections relate to the behavior and/or personality type data).

Figure 1B:
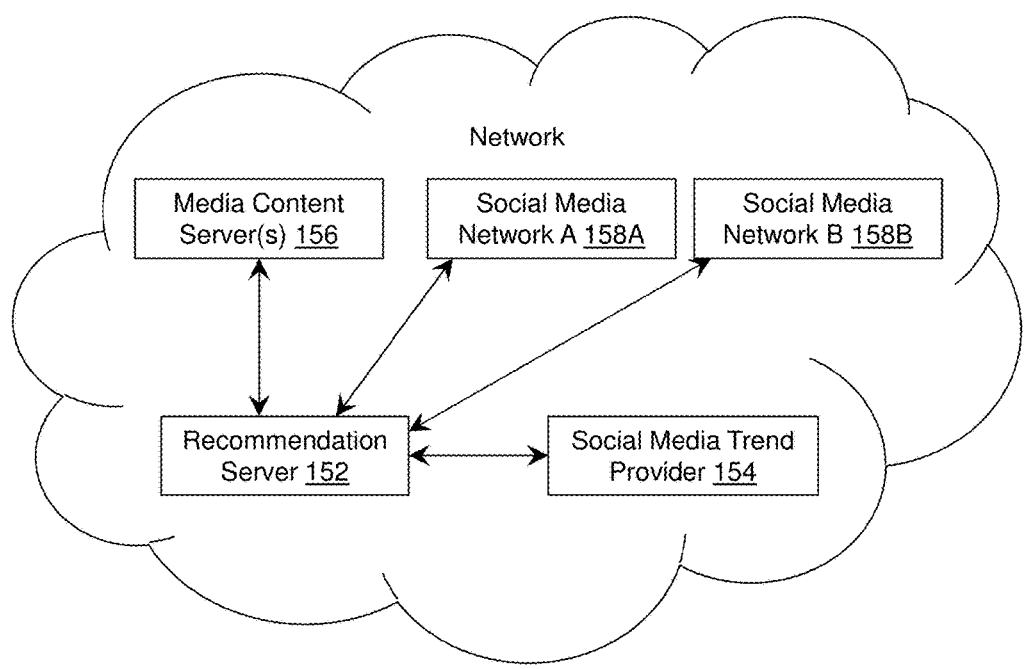
FIG. 1B depicts an illustrative embodiment of a system for providing recommendations (e.g., entertainment recommendations) based upon social media, location and/or personality types.

FIG. 1B depicts an illustrative embodiment of a system for providing recommendations (e.g., entertainment recommendations) based upon social media, location and/or personality types. As seen in FIG. 1B, a network comprises a recommendation server 152 that is in bi-directional communication with one or more media contents servers 156, social media network A 158A, social media network B 158B, and social media trend provider 154. The recommendation server 152 receives from the social media network A 158A and social media network B 158B various social media information related to one or more users. The recommendation server 152 also receives from the social media trend provider 154 various social media trend information (e.g., social media trend information related to one or more users). The entertainment server 152 provides to one or more end user devices (of the users) entertainment recommendations (e.g., recommendations to view certain media content items). Responsive to receiving (from the end user devices) selections of one or more of the entertainment recommendations, the entertainment server 152 directs one or more of the media content servers 156 to provide to each end user device a respective media content item (that is, a particular media content item that had been selected by a given end user device).

Figure 2:
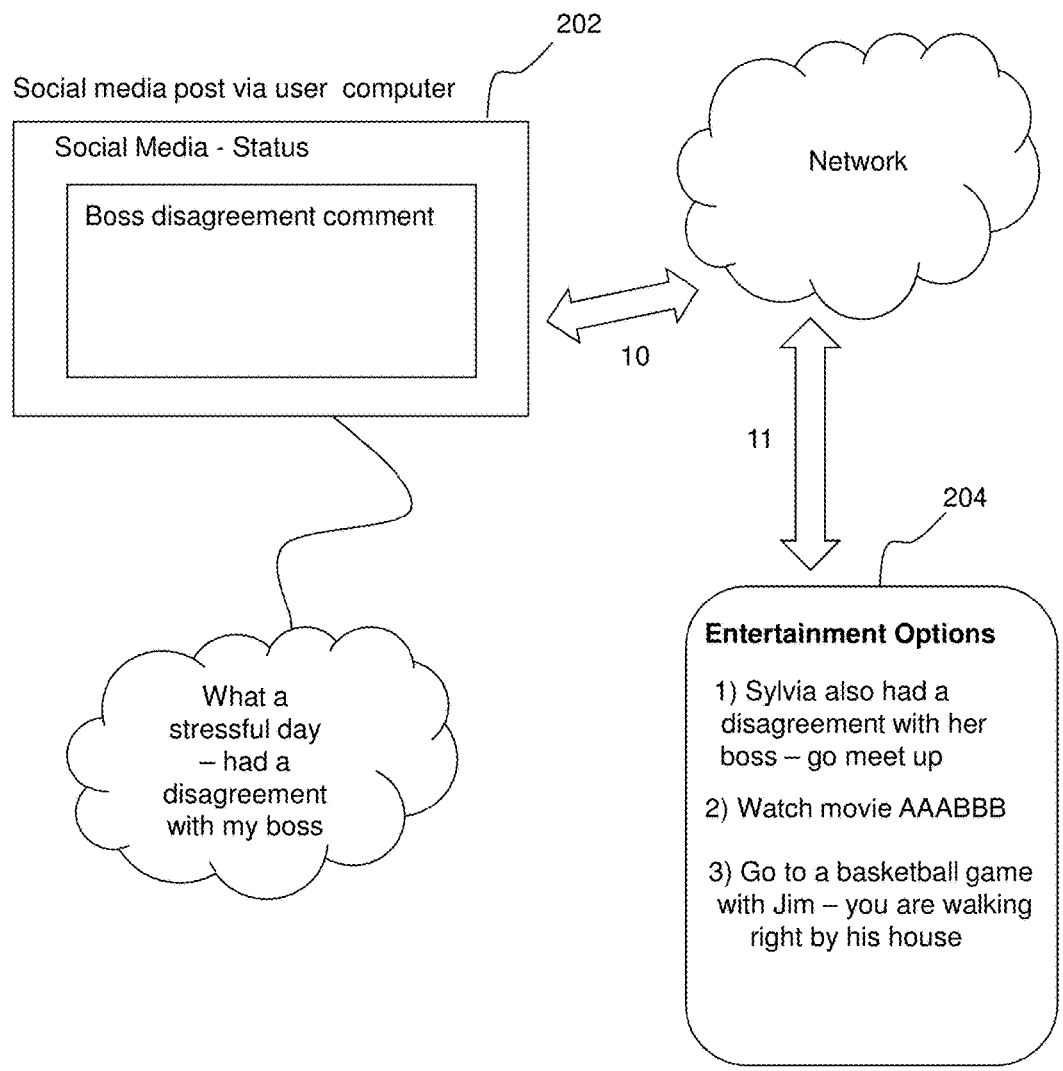
FIG. 2 depicts an illustrative embodiment of a system for providing recommendations (e.g., entertainment recommendations) based upon social media, location and/or personality types.

FIG. 2 depicts an illustrative embodiment of a system for providing recommendations (e.g., entertainment recommendations) based upon social media, location and/or personality types. As seen in FIG. 2, a user (not shown) has a disagreement with his or her boss. The user posts a comment to a social media website via computer (see display screen 202 showing the comment). The comment is uploaded to a social media network (see arrow "10"). Based upon this comment (as well as other information as described herein), a list of recommended entertainment options are provided (see arrow "11") to the user at an end user device 204 (such end user device may be the computer which the user had used to post the comment or any other desired end user device).

Figure 3A:
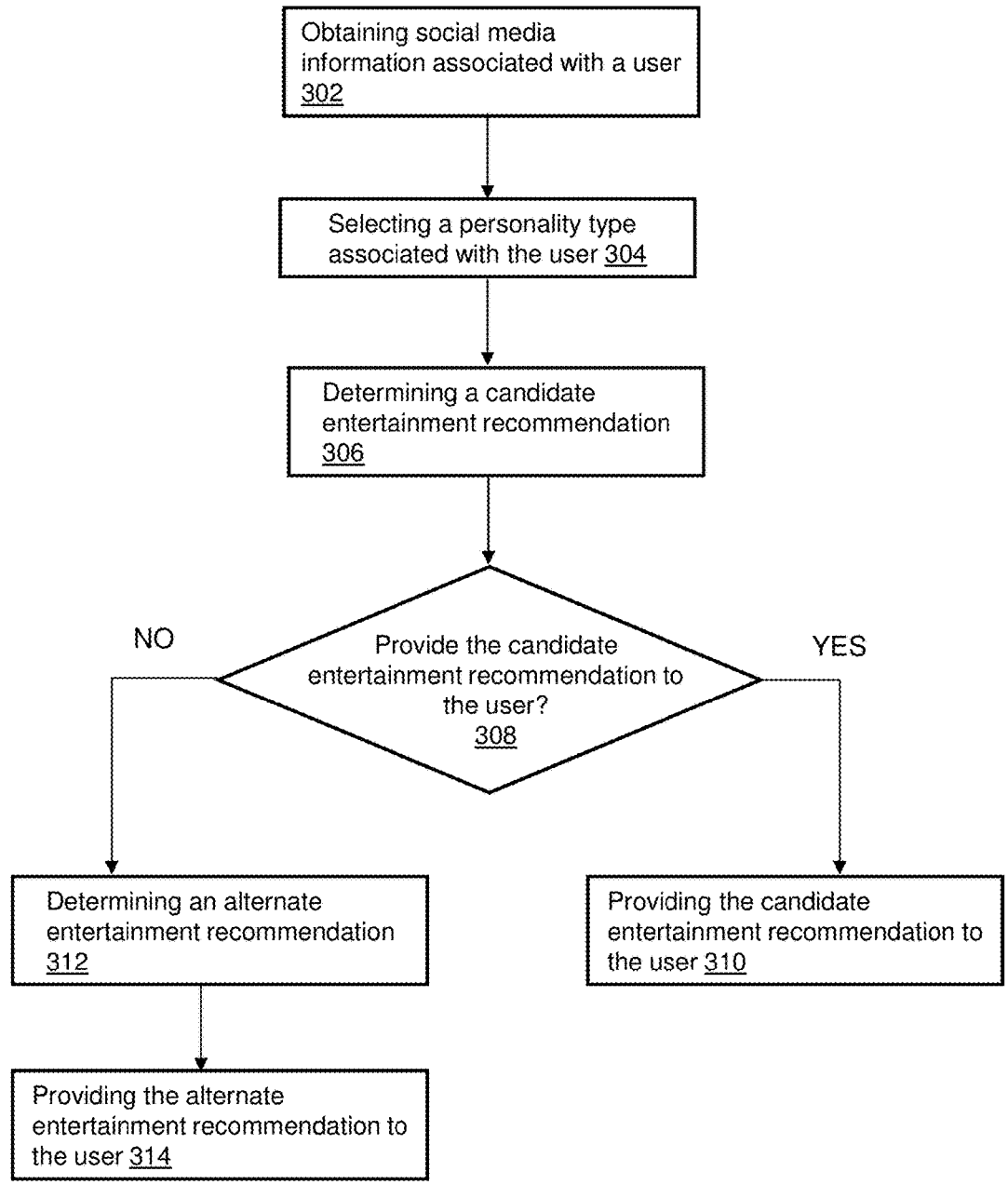
FIG. 3A depicts an illustrative embodiment of a method used in portions of the systems described in FIGS. 1A-1B and 2.

FIG. 3A depicts an illustrative embodiment of a method used in portions of the systems described in FIGS. 1A-1B and 2. While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3A, method 300 begins at step 302, with obtaining social media information associated with a user. In one example, the social media information comprises historical social media information associated with the user and current social media information associated with the user. In one specific example, the historical social media information relates to a first time period (e.g., the historical social media information was posted or otherwise made available during the first time period). In another specific example, the current social media information relates to a second time period (e.g., the current social media information was posted or otherwise made available during the second time period). In another specific example, the first time period is earlier than the second time period and the first and second time periods do not overlap.

Still referring to FIG. 3A, method 300 then continues at step 304 with selecting, based upon the historical social media information, a selected personality type associated with the user. In one example, the selected personality type is selected from a plurality of candidate personality types. Method 300 then continues at step 306 with determining, based upon the selected personality type associated with the user, a candidate entertainment recommendation. In one specific example, the candidate entertainment recommendation comprises a first recommendation to view a first electronic media content item (e.g., a movie, a television show, a live broadcast or recording of a concert, a live broadcast or recording of a sporting event). Method 300 then continues at step 308 with determining, based upon the current social media information, whether the candidate entertainment recommendation should be provided to the user. If it is determined at step 308 (YES) to provide the candidate entertainment recommendation to the user, then method 300 continues at step 310 with providing the candidate entertainment recommendation to the user. On the other hand, if it is determined at step 308 (NO) to not provide the candidate entertainment recommendation to the user, then method 300 continues at step 312 with determining, based upon the selected personality type associated with the user, an alternate entertainment recommendation. In one specific example, the alternate entertainment recommendation comprises a second recommendation to view a second electronic media content item (e.g., a movie, a television show, a live broadcast or recording of a concert, a live broadcast or recording of a sporting event), wherein the second electronic media content item is different from the first electronic media content item. Method 300 then continues at step 314 with providing to the user the alternate entertainment recommendation to view the second electronic media content item.

In one example, after step 312 (determining, based upon the selected personality type associated with the user, an alternate entertainment recommendation) is completed an additional step similar to step 308 may be performed. That is, after step 312 is completed it can be determined, based upon the current social media information, whether the alternate entertainment recommendation should be provided to the user. If it is determined to provide the alternate entertainment recommendation to the user, then the alternate entertainment recommendation may be provided to the user such as at step 314. On the other hand, if it is determined to not provide the alternate entertainment recommendation to the user, a second alternate entertainment recommendation may be determined (e.g., such as, at step 306, based upon the selected personality type associated with the user). This process to determine additional alternate entertainment recommendation(s) may be iterated as needed until a satisfactory recommendation is found and provided to the user.

Figure 3B:
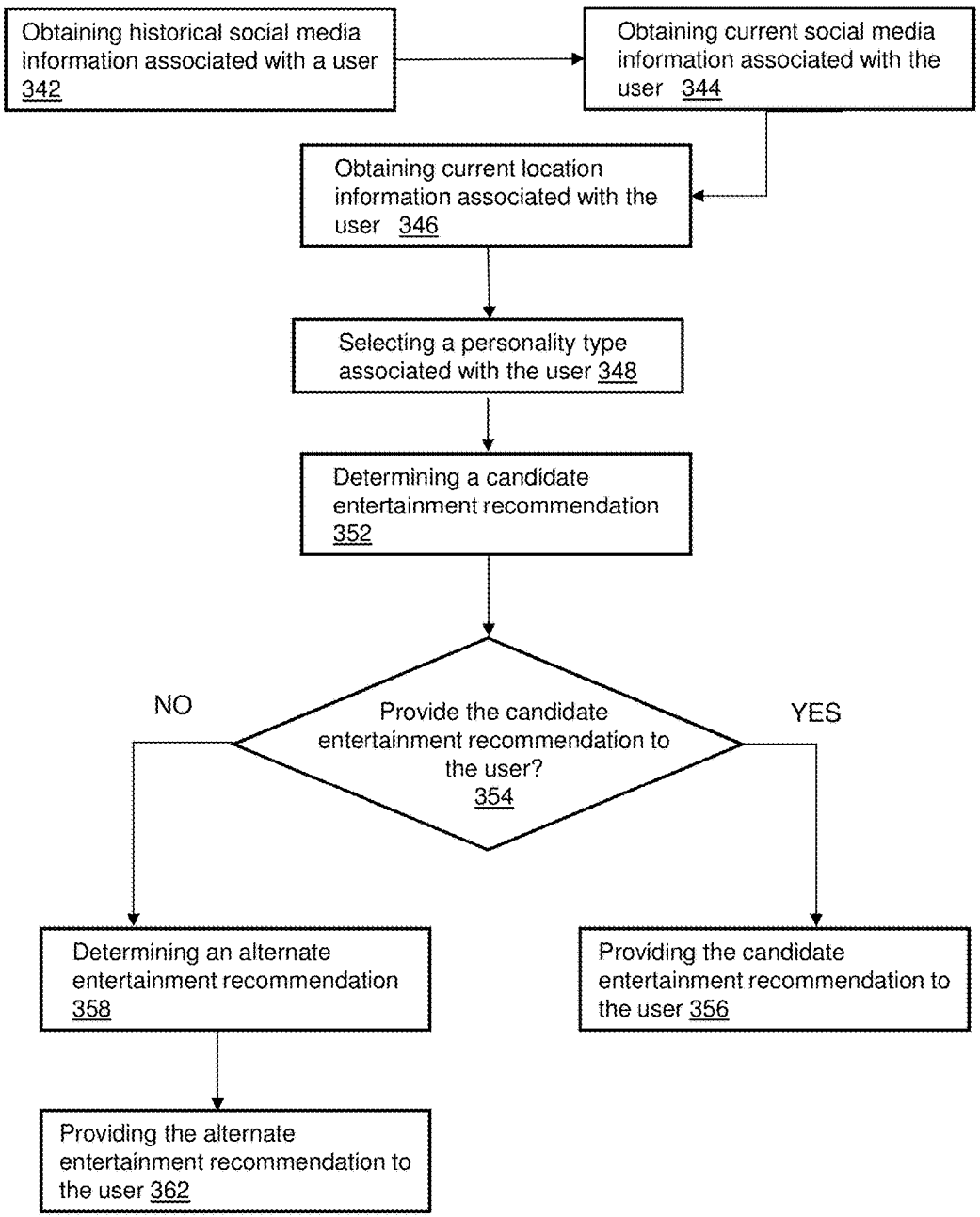
FIG. 3B depicts an illustrative embodiment of a method used in portions of the systems described in FIGS. 1A-1B and 2.

FIG. 3B depicts an illustrative embodiment of a method used in portions of the systems described in FIGS. 1A-1B and 2. While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3B, method 340 begins at step 342 with obtaining historical social media information associated with a user. In one example, the historical social media information relates to a first time period (e.g., the historical social media information was posted or otherwise made available during the first time period). Method 340 then continues at step 344 with obtaining current social media information associated with the user. In one example, the current social media information relates to a second time period (e.g., the current social media information was posted or otherwise made available during the second time period). In another specific example, the first time period is earlier in time than the second time period and the first and second time periods do not overlap.

Still referring to FIG. 3B, method 340 then continues at step 346 with obtaining current location information associated with the user (e.g., obtaining a current location of an end user device that is used by the user). In one example, the current location information is received from a mobile end user device that is co-located with the user. In one example, the current location information identifies a location of the user during the second time period. In one specific example, the end user device is a mobile end user device and comprises a smartphone or tablet. In another specific example, the location information comprises GPS information from an end user device (e.g., smartphone or tablet). In another specific example, the location information comprises information obtained from a communication network upon which the end user device operates (e.g., the location information may be obtained via signal triangulation and/or via network address geocoding).

Method 340 then continues at step 348 with selecting from a plurality of candidate personality types, based upon the historical social media information, a selected personality type associated with the user. Method 340 then continues at step 352 with determining, based upon the current location information and the selected personality type, a candidate entertainment recommendation to potentially be provided to the user. In one example, the candidate entertainment recommendation comprises a first recommendation for the user to be present at a first venue. Method 340 then continues at step 354 with determining, based upon the current social media information, whether the candidate entertainment recommendation should be provided to the user. If it is determined at step 354 (YES) to provide the candidate entertainment recommendation to the user, then method 340 continues at step 356 with providing the candidate entertainment recommendation to the user. On the other hand, if it is determined at step 354 (NO) to not provide the candidate entertainment recommendation to the user, then method 340 continues at step 358 with determining, based upon the current location information and the selected personality type, an alternate entertainment recommendation be provided to the user. In one specific example, the alternate entertainment recommendation comprises a second recommendation for the user to be present at a second venue, wherein the second venue is different from the first venue. Method 340 then continues at step 362 with providing to the user the second recommendation to be present at the second venue.

In one example, after step 358 (determining, based upon the current location information and the selected personality type, an alternate entertainment recommendation be provided to the user) is completed an additional step similar to step 354 may be performed. That is, after step 358 is completed it can be determined, based upon the current social media information, whether the alternate entertainment recommendation should be provided to the user. If it is determined to provide the alternate entertainment recommendation to the user, then the alternate entertainment recommendation may be provided to the user such as at step 356. On the other hand, if it is determined to not provide the alternate entertainment recommendation to the user, a second alternate entertainment recommendation may be determined (e.g., such as, at step 352, determining, based upon the current location information and the selected personality type, a candidate entertainment recommendation to potentially be provided to the user). This process to determine additional alternate entertainment recommendation(s) may be iterated as needed until a satisfactory recommendation is found and provided to the user.

Figure 3C:
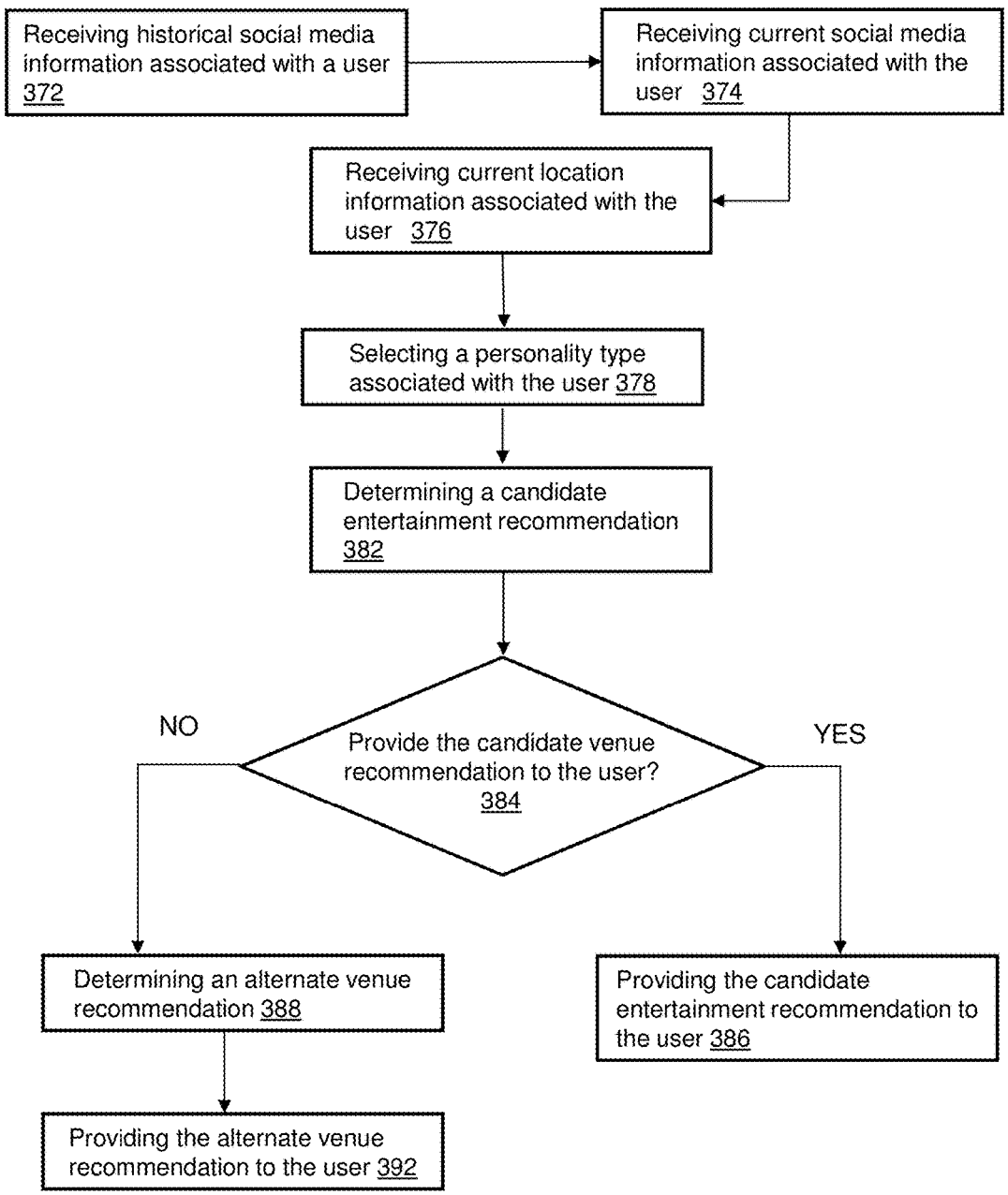
FIG. 3C depicts an illustrative embodiment of a method used in portions of the systems described in FIGS. 1A-1B and 2.

FIG. 3C depicts an illustrative embodiment of a method used in portions of the systems described in FIGS. 1A-1B and 2. While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3C, method 370 begins at step 372 with receiving historical social media information associated with a user. In one example, the historical social media information relates to a first time period (e.g., the historical social media information was posted or otherwise made available during the first time period). Method 370 then continues at step 374 with receiving current social media information associated with the user. In one example, the current social media information relates to a second time period (e.g., the current social media information was posted or otherwise made available during the second time period). In another specific example, the first time period is earlier in time than the second time period and the first and second time periods do not overlap.

Still referring to FIG. 3C, method 370 then continues at step 376 with receiving current location information associated with the user (e.g., receiving a current location of an end user device that is used by the user). In one example, the current location information is received from a mobile end user device that is co-located with the user. In one specific example, the end user device is a mobile end user device and comprises a smartphone or tablet. In another specific example, the location information comprises GPS information from the end user device. In another specific example, the location information comprises information obtained from a communication network upon which the end user device operates (e.g., the location information may be obtained via signal triangulation and/or via network address geocoding).

Method 370 then continues at step 378 with selecting, based upon the historical social media information, a selected personality type associated with the user, wherein the selected personality type is one of a plurality of candidate personality types. Method 370 then continues at step 382 with determining, based upon the current location information and the selected personality type, a candidate venue recommendation for the user, wherein the candidate venue recommendation comprises a first recommendation to be present at a first venue. Method 370 then continues at step 384 with determining, based upon the current social media information, whether the candidate venue recommendation should be provided to the user. If it is determined at step 384 (YES) to provide the candidate entertainment recommendation to the user, then method 370 continues at step 386 with providing the candidate entertainment recommendation to the user. On the other hand, if it is determined at step 384 (NO) to not provide the candidate entertainment recommendation to the user, then method 370 continues at step 388 with determining, based upon the current location information and the selected personality type, an alternate venue recommendation for the user. In one specific example, the alternate venue recommendation comprises a second recommendation to be present at a second venue, the second venue being different from the first venue. Method 370 continues at step 392 with providing to the user the second recommendation to be present at the second venue.

In one example, after step 388 (determining, based upon the current location information and the selected personality type, an alternate entertainment recommendation be provided to the user) is completed an additional step similar to step 384 may be performed. That is, after step 388 is completed it can be determined, based upon the current social media information, whether the alternate entertainment recommendation should be provided to the user. If it is determined to provide the alternate entertainment recommendation to the user, then the alternate entertainment recommendation may be provided to the user such as at step 386. On the other hand, if it is determined to not provide the alternate entertainment recommendation to the user, a second alternate entertainment recommendation may be determined (e.g., such as, at step 382, determining, based upon the current location information and the selected personality type, a candidate entertainment recommendation for the user). This process to determine additional alternate entertainment recommendation(s) may be iterated as needed until a satisfactory recommendation is found and provided to the user.

In one embodiment, a single recommendation (e.g., in the form of a single alternate recommendation) is provided to the user at a given time. In another embodiment, multiple recommendations are provided to the user at a given time. In one specific example, the multiple recommendations may be in the form of multiple alternative recommendations. In another specific example, the multiple recommendations may be in the form of a single alternative recommendation along with one or more other (e.g., non-alternative) recommendations. In another specific example, the multiple recommendations are provided to the user in two or more groups at a given time (wherein each group relates, for example, to a type of recommendation). For instance, one group may relate to TV/movies/theater and another group may relate to outdoors and another group may relate to social events, etc.

In one example, each personality type may be one of "Type A" (competitive, outgoing, ambitious, impatient and/or aggressive) or "Type B" (a more relaxed personality). In another example, each personality type may be one of the 16 "Myers-Briggs" personality types.

In another example, personality types may be determined and/or utilized as described in Rentfrow, P. J., Goldberg, L. R & Zilca, R. (2010), "Listening, Watching, and Reading: The Structure and Correlates of Entertainment Preferences" in Journal of Personality (the contents of which are incorporated by reference herein in their entirety). For instance, various embodiments described herein may utilize the classification of personalities (using Goldberg's (1999) IPIP-AB5C Inventory) into one of the following five broad categories: Extraversion, Agreeableness, Conscientiousness, Emotional Stability, and Intellect/Imagination. In another example, depending on the specific group (from the aforementioned choice of five) that someone is categorized in, that person could then be grouped (for purposes of entertainment choices) to one of the following five entertainment preferences: Communal (centering around people and relationships); Aesthetic (creative, abstract and demanding); Dark (intense and edgy); Thrilling (filled with action, suspense and adventure); Cerebral (factual and information-orientated).

In another example, personality types may be determined and/or utilized as described in Golbeck, J., Robles, C., Turner, K. (2011), Predicting Personality with Social Media, CHI EA '11 CHI '11 in Extended Abstracts on Human Factors in Computing Systems, pages 253-262 (the contents of which are incorporated by reference herein in their entirety). For instance, various embodiments described herein may utilize techniques of Golbeck et al. related to predicting personality type based on social media posts.

As described herein, various embodiments provide mechanisms to monitor social media, determine personality type, and then recommend entertainment type.

In one embodiment, a step of selecting a personality type based upon historical social media information (see, e.g., step 304 of FIG. 3A, step 348 of FIG. 3B and step 378 of FIG. 3C) may be carried out by matching historical social media posts, comments, activities, etc. to a closest one of a plurality of candidate personality types. For instance, if a person's social media posts, comments, activities, etc. are generally of an upbeat nature, the selected personality type would correspond to an upbeat person. In another example, if a person's social media posts, comments, activities, etc. are generally of an outgoing nature, the selected personality type would correspond to an extroverted person.

In one embodiment, a step of determining a candidate entertainment recommendation based upon the selected personality type (see, e.g., step 306 of FIG. 3A) may be carried out by matching the selected personality type to one or more entertainment options. For instance, if a person's selected personality type is indicative of a good sense of humor, the entertainment options would include watching a comedy or funny movie.

In another embodiment, a step of determining a candidate entertainment (or venue) recommendation based upon the current location information and the selected personality type (see, e.g., step 352 of FIG. 3B and step 382 of FIG. 3C) may be carried out by matching the selected personality type to one or more entertainment (or venue) options in the context of the user's current location. For instance, if a person's selected personality type is indicative of enjoying outdoor activities, the entertainment (or venue) options would include walking in a nearby park.

In one embodiment, a step of determining whether the candidate entertainment (or venue) recommendation should be provided to the user based upon the current social media information (see, e.g., step 308 of FIG. 3A, step 354 of FIG. 3B and step 384 of FIG. 3C) may be carried out by analyzing whether the current social media posts, comments, activities, etc. differ in sentiment from the historical social media posts, comments, activities, etc. such that the candidate entertainment (or venue) recommendation would not be appropriate for the user at the current time (e.g., that the user, in his or her current state of mind, would not enjoy the candidate entertainment recommendation).

In one embodiment, a step of determining one or more alternate entertainment (or venue) recommendations (see, e.g., step 312 of FIG. 3A) may be carried out in a manner similar to step 306 of FIG. 3A. Further, a step of determining one or more alternate entertainment (or venue) recommendations (see, e.g., step 358 of FIG. 3B and step 388 of FIG. 3C) may be may be carried out in a manner similar to step 352 of FIG. 3B and/or step 382 of FIG. 3C.

In another example, an entertainment recommendation to be present at a certain venue (e.g., attend a certain event) may be provided on a map (e.g., showing the location of the venue on a map presented on a display of a mobile end user device, such as a smartphone or tablet).

In another example, an entertainment recommendation may include an indication to the user as to where a particular media content item is available (e.g., available from which media content provider) and/or at what cost the particular media content item is available (e.g., at a first cost from a first media content provider and at a second (e.g., lower) cost from a second media content provider). In another example, a particular media content item may be obtained (e.g., by an end user device) from a particular media content provider selected by the user (e.g., selected by the user based upon cost).

In another example, upon selection of an entertainment recommendation by a user (e.g., selection of a particular venue), a reservation (e.g., a reservation at restaurant) can be automatically obtained (e.g., by the end user device or by the recommendation providing mechanism). In another example, upon selection of an entertainment recommendation by a user (e.g., selection of a particular event), a ticket (e.g., a ticket for a concert or sporting event) can be automatically obtained (e.g., by the end user device or by the recommendation providing mechanism).

In another example, the recommendations for a specific user can be provided without input from the specific user. In another example, the recommendations for a specific user can be provided using specific data input beforehand by the specific user.

In another example, the recommendations for a specific user can be provided based upon one or more people who are with the specific user (e.g., based on location data from devices carried by the specific user and/or the other people; based upon social media information associated with the specific user and/or the other people).

In another example, the recommendations for a user (e.g., using a specific end user device) may be based upon other devices of the user (e.g., a recommendation for a user using a mobile device such as a smartphone or tablet may be based upon information associated with a home DVR of the user and/or a home computer of the user and/or a work computer of the user). In another example, the recommendations for a user may be based upon various software programs used by the user (e.g., a recommendation for a user may be based upon data in a calendar program of the user).

As described herein, a number of possible recommendations can be narrowed down (or filtered) based upon a current user location (wherein a subset of the possible recommendations is provided to the user based upon the current user location).

In another example, data may be obtained from a social media network via calls to one or more servers (e.g., via an application programming interface (API)). In another example, media content (e.g., video, music) may be obtained from a media content provider via calls to one or more servers (e.g., via an application programming interface (API)).

In another example, a first media content item (e.g., video, music) may be recommended above (or instead of) a second media content item (e.g., video, music) based upon the first media content item being available from a media content provider with which the user has a subscription and the second media content item not being available from a media content subscriber with which the user has a subscription.

As described herein, various embodiments provide for improving recommendations via a feedback loop and/or machine learning. For example, future recommendations can be influenced by selections of prior recommendations provided to a user. For instance, future recommendations can be influenced by prior recommendations that were followed (that is, in which the user had shown an interest) and/or by prior recommendations that were not followed (that is, in which the user had not shown an interest).

In one example, the feedback loop and machine learning may apply weighting or prioritization to selections of prior recommendations provided to a user. For instance, a user may have been presented with five recommendation options. The user may have selected option number 2 (a movie) but not selected option numbers 1 and 3-5. However, the user could have spent some time online reviewing a menu for a restaurant presented as option number 5. In this case, the time spent reviewing the menu could be inferred as showing some interest and future recommendations may give some weight to that restaurant (while giving more weight to the movie and less weigh to the other unselected options). In another example, inferences of likes and or dislikes can be made by the recommendation providing mechanism (e.g., a user likes X and Y so the user would also like Z; or a user dislikes X and Y so the user would also dislike Z).

As described herein, various embodiments provide entertainment recommendations based upon: (a) social media information from a social media network; and (b) location information. The entertainment recommendations may be to receive certain media content (e.g., video content such as a particular television show or particular music) or for a certain activity (e.g., going to a particular movie theater to see a particular movie, going to the park to meet a friend, going rock climbing).

The social media information may be based on social media posts, status, and/or activity from the user (e.g., what you've indicated you like and/or dislike, adding friends, sharing posts, removing friends, relationship status, employment status, etc.). For example, if somebody's relationship status changes from engaged to single then various embodiments described herein can make a recommendation to cheer them up (e.g., hang out with friends, see a funny movie, go to the amusement park, walk the dog). Further, in this example, certain recommendations (such as wedding related videos or activities) may be avoided.

In another embodiment, current high peak social media trends fed in from social media monitoring systems can help to determine the recommendations and/or avoid recommendations. For example, if social media trends are discussing a positive current event then the system may recommend an activity related to the positive current event. On the other hand, if social media trends are discussing a negative current event then the system may avoid recommending an activity related to the negative current event.

In another embodiment, location information (such as collected over a span of time) can provide lifestyle information to enable appropriate recommendations (and/or prohibit inappropriate recommendations). For instance, regular visits to a cancer treatment facility (for example, combined with information from social media) would result in recommendations that avoid medically related videos/shows or activities that might require too much energy expenditure. On the other hand, for example, regular visits to a rock climbing gym may increase the likelihood that rock climbing videos and/or rock climbing gyms will appear in the recommendations. In another example, an irregular single visit to a location may trigger a recommendation (or avoidance of a recommendation).

In another embodiment, psychological information about the person based on an analysis of his/her social media activity and/or explicitly entered behaviors/issues could be used to modify the recommendations as well. For example, if the person whose relationship status changed from engaged to single is an introvert and loves dogs then a dog walk may be the most appropriate activity recommended. In another example, if a person is afraid of the dark, then a recommendation to go to a dark venue such as a movie could be excluded.

In another embodiment, aggregate information on behaviors and entertainment could be sent to research institutions (or other such entities) to gain a better understanding of behavior and entertainment wants/needs. In one specific example, aggregate information (e.g., which has been anonymized) on behaviors and entertainment could be sold.

In another embodiment, a particular device on which recommendation(s) are received and/or selected may be the same device upon which the media content is received and/or presented.

As described herein, informed entertainment recommendations may be provided via various cloud-based mechanisms.

In other embodiments mechanisms may be provided to: (a) connect to "internet-of-things" (IoT) sensors and data networks to improve recommendations (e.g., by using IoT data as input); (b) use visual and/or auditory emotion sensing to improve recommendations; and/or (c) use body implants to monitor chemicals in the brain to help judge mood and entertainment needs.

In another example, one entertainment recommendation (e.g., a particular television show or a particular venue) may be provided instead of another because of an external event (a positive event and/or negative event).

In another example, a mental profile (e.g., containing information as described herein) of one or more family members and/or friends may be used to adjust a mental profile (e.g., containing information as described herein) of a user who is receiving the entertainment recommendation(s).

In another example, one or more of the social media networks described herein can be based upon one or more applications run on one or more servers.

As described herein, social media interactions and location may be used to determine entertainment needs/wants. In one example, social media interactions and location long-term trends may be used to determine entertainment needs/wants. Various embodiments go beyond just the locations visited to the actual significance of those locations (e.g. cancer treatment facility) or the significance of a very different location visit (e.g., with long-term trends used). Various embodiments use actual psychological models to determine a person's type. Various embodiments use psychological guidelines for what types of entertainment needs/wants are ideal to a particular user. Aggregate behavioral data and choices made can be used to inform science on entertainment needs/wants of different types of individuals.

As described herein, life events (which often dictate a person's moods and entertainment wants and needs) are utilized to make various recommendations (people often share these events and moods on social media, from which the data may be obtained). In addition, a person's visited locations (which often also tell a story about their day to day and overall lifestyle) may be utilized to make various recommendations. Various embodiments may utilize intelligence (e.g., machine learning) to determine those entertainment wants and needs and to propose appropriate entertainment options (e.g., that would help fight a depressive state of mind).

As described herein, various embodiments provide for entertainment recommendations (e.g., video content and/or activities) that use social media and location activity to enhance such recommendations. For example, based on social media posts and status (e.g., what a user has indicated he or she likes and dislikes) and activity from the user (e.g., adding friends, sharing posts, removing friends, relationship status, employment status, etc.) the entertainment recommendation mechanisms described herein will recommend appropriate activities. For example, if somebody's relationship status changes from engaged to single, recommendations will be provided to cheer that person up (e.g., hang out with friends, funny movie, amusement park, walk the dog). In this example, wedding related videos or activities may be avoided as recommendations. In another example, if someone becomes engaged, other (different) recommendations would be provided.

As described herein, various embodiments provide for utilizing current high peak social media trends (e.g., fed in from social media monitoring systems) to help to determine the recommendations (and/or to avoid certain recommendations).

As described herein, various embodiments provide for using location information (both over time as well as along with the nature of the locations) as a source of lifestyle information in order to enable appropriate recommendations. For example, regular visits to a cancer treatment facility (combined with information from social media) would result in recommendations that avoid medically related videos/shows or activities that might require too much energy expenditure. In another example, regular visits to a rock climbing gym may increase the likelihood that rock climbing videos and/or rock climbing gyms will appear in the recommendations. An irregular single visit to a location may also trigger a particular recommendation (and/or avoid a particular recommendation).

As described herein, various embodiments provide for use of psychological information about a user (e.g., based on an analysis of social media activity and/or explicitly entered behaviors/issues) to affect the recommendations as well (e.g., if the person who's relationship status changed from engaged to single is an introvert and loves dogs then a dog walk may be the most appropriate activity recommended). In one example, the guidelines to create psychological profiles could be added (e.g., to one or more databases) over time by psychiatric governing bodies.

As described herein, various embodiments provide for use of "big data" psychological information. For example, aggregate information on behaviors and entertainment could be sent to research institutions to gain a better understanding of behavior and entertainment wants/needs.

As described herein, the recommendation providing mechanism can improve over time. For example, based on recommendations that have been selected by the user, future recommendations can be improved over time to match the user's preferred types of entertainment.

As described herein, based on entertainment choices made by the user outside of the recommendation providing mechanism (e.g., based on location or social media input) the mechanism can also learn more about what types of entertainment the user likes.

As described herein, various embodiments require no explicit input from the user. In one example, the recommendation providing mechanism is privacy sensitive and will only use information it has been given permission or authorization to access (e.g., via an opt-in procedure carried out by the user). In one example, an entity operating the recommendation providing mechanism may enable a profile that allows or prohibits certain people access. In one example, a user may have a profile with an email address, a list of medications, a list media content providers with which the user has a subscription, and a list of people (e.g., the user's doctor(s), the user's family members, the user's friends) who can provide input and/or receive output (e.g., input/output related to recommendations, life events, health).

As described herein, various embodiments provide for use of input from other people (e.g., family, friends, other loved ones). In one example, given permission, such others could provide input to the recommendation providing mechanism to enhance the recommendations (e.g. a user's brother hears of an event that happened to the user that is not posted on social media and the user's brother advises the recommendation providing mechanism (such as via input at a website) to avoid certain recommendations and/or to make certain recommendations).

As described herein, various embodiments provide for customers to have a way to get better entertainment recommendations (e.g., to help them cope with their daily life). The recommendations can be, for example, videos, movies, TV shows, music listening, eating, theater, active activities, sports, social interactions with others. Such a mix of different personalized recommendations may be provided via a dynamic mechanism (e.g., utilizing a feedback loop to improve recommendations). In one example, no explicit input is required from the user to still obtain very personalized recommendations. The recommendations may be based upon existing social media interactions over time combined with smart algorithms (e.g., machine learning). In one example, overall social media trends may be used to influence the recommendations (such that the user will avoid and/or or get recommendations appropriate for society's current issues). The recommendation providing mechanism may use location-based information over time combined with smart algorithms (e.g., machine learning) to know of the meaning of regularly frequented places and/or uncommonly frequented places to provide entertainment recommendations. The recommendation providing mechanism can use psychological information of the user (determined intrinsically through behavior and/or extrinsically from direct input) to provide appropriate recommendations (that is, personalized recommendations). Aggregate data from the recommendation providing mechanism (e.g., data stored in one or more databases) could be used by research entities to gain a better understanding of behavior and entertainment wants/needs. The recommendation providing mechanism may learn over time the specific user's entertainment preferences and may improve recommendations based on such preferences. The improvement may result from a feedback loop and machine learning. In one example, the recommendation providing mechanism may use entertainment choices selected from an app as well as entertainment that has been engaged in outside of the app but detected based on location and/or over social media. The recommendation providing mechanism can be configured to only access information that it is allowed to access (e.g., based on the user's preference in a profile). Loved ones (or other interested parties) can be given access to also input information that would affect the recommendations (so that people can better take care of each other).

As described herein, various embodiments provide for academia, psychologists and psychiatrists to upload to the cloud (e.g., to one or more servers) different behavioral profiles and recommendations to help identify different types of people based on behavior and also what sort of entertainment that "type" of person may prefer (e.g., active, non-active, social, non-social, comic, soothing, etc.). Customers may opt-in to sharing social media interactions and location in return for getting more personalized entertainment recommendations. Various embodiments may utilize an application component (e.g., running on an end user device) that displays the recommendations and a central processing and algorithm component in the cloud (e.g., running on one or more servers) that receives the social media interactions and location information. The central cloud component may process social media interactions and location information and determines both overall patterns (e.g., daily/weekly/monthly patterns of various occurrences) as well as specific daily occurrences of relevance. Algorithms within the central cloud component may be used to do several things, including: (a) associate the occurrences (e.g., historical occurrences) with behavior types to help determine what type of person this is; (b) associate recent occurrences with entertainment options; (c) associate overall trends with recent occurrences and look for differences to create more recommendations and/or avoid certain recommendations; (d) run the entertainment recommendations through the psychological guidelines for that behavior type—possibly flagging as inappropriate one or more recommendations; (e) run the entertainment recommendations through the psychological specific rules for specific types of events (e.g. recent relationship problems, recent physical trauma, etc.)—possibly flagging as inappropriate one or more recommendations; and/or (f) use overall social media trends to influence recommendations in terms of types of events and locations.

As described herein, overall aggregate data on behaviors, entertainment recommendations and the choices of recommendations can be shared with research organizations (and/or a provider of the entertainment recommendations) in order to improve the algorithms and rules used for recommendations directed towards different behavior/personality types.

As described herein, types of recommendation options selected by a specific user may be used to learn about the specific user and in the future recommend better entertainment for that user (e.g. a specific user never chooses to go to the theater—future recommendation options might exclude the theater. In one specific example, before such exclusion, the user may be asked if ever interested in theater—if never interested, then theater may be excluded from future recommendations presented to the user).

As described herein, entertainment activities that the user engages in that had not been provided by the recommendation providing mechanism (but detected, for example, over social media and/or based on location) may be used by the recommendation providing mechanism to improve its recommendations in the future.

As described herein, a user's loved ones (or other interested parties) who are given permission can also input events that may have happened to help with the recommendations. In another example, recommendations can be based upon the social media feeds of such loved ones or other interested parties (if such loved ones or other interested parties give permission, such as via an opt-in procedure).

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100 of FIG. 1A, system 150 of FIG. 1B and/or system 200 of FIG. 2 as another representative embodiment of communication system 400. For instance, one or more devices illustrated in the communication system 400 of FIG. 4 function as a user device of FIG. 1A to receive entertainment recommendations, select entertainment recommendations, and to receive media content items. In another example, one or more devices illustrated in the communication system 400 of FIG. 4 function as a recommendation server 152 of FIG. 1B to provide entertainment recommendations and to receive selections of entertainment recommendations. In another example, one or more devices illustrated in the communication system 400 of FIG. 4 function as one or more of media content servers 156 of FIG. 1B to provide media content items (e.g., provide video content to an end user device).

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Such a web server may operate as and/or provide functions of recommendation server 152 of FIG. 1B. In another example, such a web server may operate as and/or provide functions of one or more of media content servers 156 of FIG. 1B.

Communication system 400 can also provide for all or a portion of the computing devices 430 to function as a recommendation server (herein referred to as recommendation server 430). The recommendation server 430 can use computing and communication technology to perform function 462, which can include among other things, the entertainment recommendation techniques described by method 300 of FIG. 3A, method 340 of FIG. 3B and/or method 370 of FIG. 3C. For instance, function 462 of recommendation server 430 can be similar to the functions described for recommendation server 152 of FIG. 1B in accordance with method 300, method 340 and/or method 370. The media processors 406 and wireless communication devices 416 can be provisioned with software functions 464 and 466, respectively, to utilize the services of recommendation server 430. For instance, functions 464 and 466 of media processors 406 and wireless communication devices 416 can be similar to the functions described for the end user devices 102, 104, 106, 112, 114 and 116 of FIG. 1A in accordance with method 300, method 340 and/or method 370.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
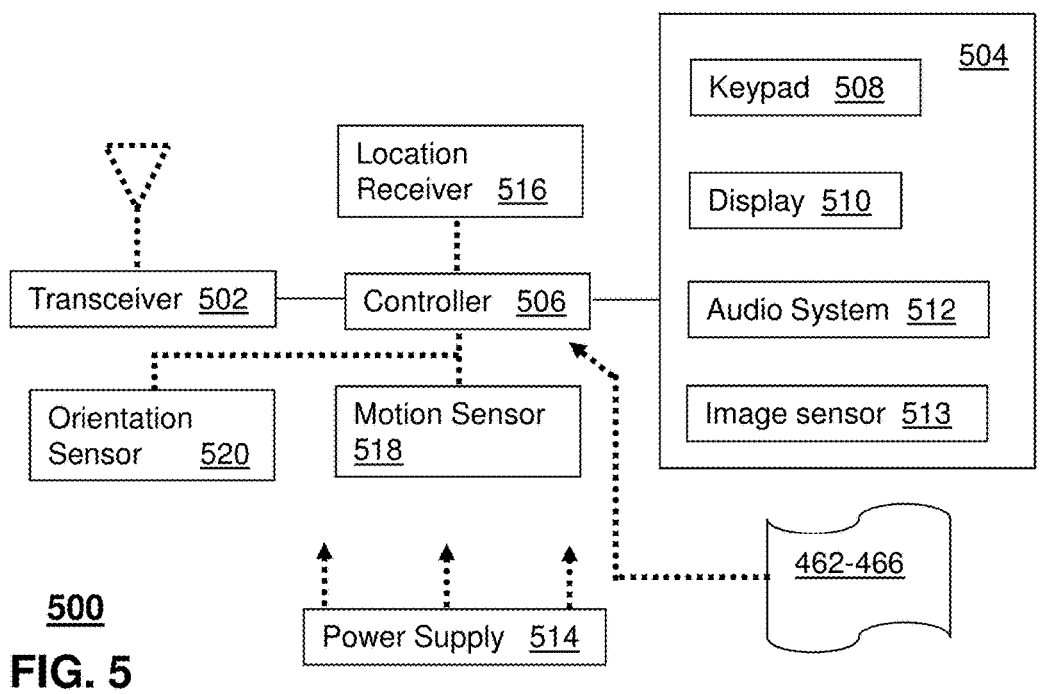
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1A, 1B, 2 and/or 4 and can be configured to perform portions of (or all of) method 300 of FIG. 3A, method 340 of FIG. 3B, and/or method 370 of FIG. 3C.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices of FIGS. 1A, 1B and/or 2, the media processor 406, the media devices 408, or the portable communication devices 416 of FIG. 4. It will be appreciated that the communication device 500 can also represent other devices that can operate in systems of FIGS. 1A, 1B, 2 and/or communication system 400 of FIG. 4 such as a gaming console and a media player. In addition, the controller 506 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, any desired number of end user devices may communicate with any desired number of recommendation server(s) and/or any desired number of media content server(s). Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
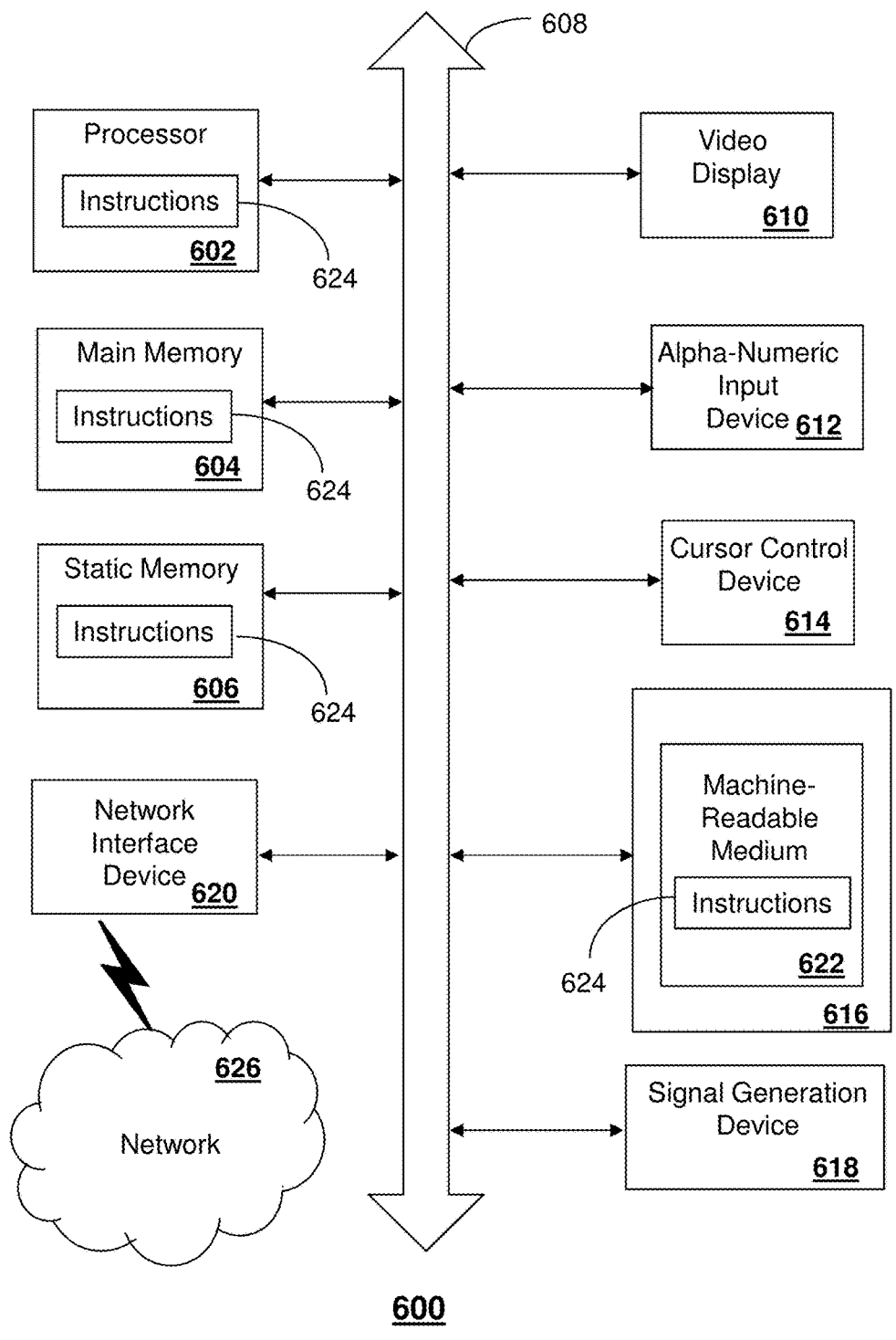
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as a user device 102, 104, 106, 112, 114, 116, the recommendation server 152, a media content server 156, the recommendation server 430, the media processor 406, and/or other devices of FIGS. 1A, 1B, 2 and 4.

In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium comprising executable instructions that, when executed by a processing system including a processor, perform operations comprising:
    obtaining social media information associated with a user, wherein the social media information comprises historical social media information associated with the user and current social media information associated with the user, wherein the historical social media information relates to a first time period, wherein the current social media information relates to a second time period, wherein the first time period is earlier than the second time period, and wherein the first and second time periods do not overlap;
    selecting, based upon the historical social media information, a selected personality type associated with the user, wherein the selected personality type is selected from a plurality of candidate personality types;
    determining, based upon the selected personality type associated with the user, a candidate entertainment recommendation, wherein the candidate entertainment recommendation comprises a first recommendation to view a first electronic media content item;
    determining, based upon the current social media information, whether the candidate entertainment recommendation should be provided to the user;
    responsive to determining that the candidate entertainment recommendation should not be provided to the user:
        determining, based upon the selected personality type associated with the user, an alternate entertainment recommendation, wherein the alternate entertainment recommendation comprises a second recommendation to view a second electronic media content item, the second electronic media content item being different from the first electronic media content item; and
        providing to the user the alternate entertainment recommendation to view the second electronic media content item.

2. The non-transitory machine-readable storage medium of claim 1, wherein the obtaining the social media information comprises obtaining the social media information from a social media network.

3. The non-transitory machine-readable storage medium of claim 2, wherein the obtaining the social media information from the social media network comprises:
    sending a social media information request to the social media network; and
    receiving from the social media network, responsive to the sending of the social media information request, the social media information.

4. The non-transitory machine-readable storage medium of claim 1, wherein the social media information comprises a social media network post by the user, a social media network status of the user, a social media network activity of the user, a social media network post by a person other than the user, a social media network status of a person other than the user, a social media network activity of a person other than the user, or a combination thereof.

5. The non-transitory machine-readable storage medium of claim 1, wherein:
    the second time period is selected from a group comprising one minute, one hour, one day and one week; and
    the first time period is longer than the second time period.

6. The non-transitory machine-readable storage medium of claim 1, wherein each of the first and second electronic media content items comprises a movie or a television show.

7. The non-transitory machine-readable storage medium of claim 1, wherein the operations further comprise:
    receiving from the user, responsive to the providing to the user the second recommendation to view the second electronic media content item, a request to obtain the second electronic media content item; and
    transmitting to the user, responsive to the request to obtain the second electronic media content item, the second electronic media content item;
    wherein the request to obtain the second electronic media content item is received from the user via an end user device; and
    wherein the transmitting to the user the second electronic media content item comprises transmitting to the end user device the second electronic media content item from a media content server.

8. The non-transitory machine-readable storage medium of claim 7, wherein the end user device comprises a stationary network-connected media processor, a mobile network-connected communication device, or a combination thereof.

9. The non-transitory machine-readable storage medium of claim 1, wherein:
the operations further comprise obtaining subscription information of the user, wherein the subscription information identifies a source of electronic media content to which the user has an access right; and
the determining, based upon the current social media information, whether the candidate entertainment recommendation should be provided to the user further comprises
determining, based upon the subscription information of the user, whether the candidate entertainment recommendation should be provided to the user.

10. The non-transitory machine-readable storage medium of claim 9, wherein the determining, based upon the subscription information of the user, whether the candidate entertainment recommendation should be provided to the user comprises:
determining whether the first electronic media content item of the candidate entertainment recommendation is available from the source of electronic media content to which the user has the access right; and
making a determination, responsive to determining that the first electronic media content item of the candidate entertainment recommendation is not available from the source of electronic media content to which the user has the access right, that the candidate entertainment recommendation should not be provided to the user.

11. The non-transitory machine-readable storage medium of claim 1, wherein:
the operations further comprise obtaining social media trend information; and
the determining, based upon the current social media information, whether the candidate entertainment recommendation should be provided to the user further comprises determining, based upon the social media trend information, whether the candidate entertainment recommendation should be provided to the user.

12. The non-transitory machine-readable storage medium of claim 11, wherein the determining, based upon the social media trend information, whether the candidate entertainment recommendation should be provided to the user comprises determining, based upon the social media trend information, that the candidate entertainment recommendation should not be provided to the user.

13. A system comprising:
a processor; and
a memory storing executable instructions that, when executed by the processor, perform operations comprising:
obtaining historical social media information associated with a user, wherein the historical social media information relates to a first time period;
obtaining current social media information associated with the user, wherein the current social media information relates to a second time period, wherein the first time period is earlier in time than the second time period, and wherein the first and second time periods do not overlap;
obtaining current location information associated with the user, wherein the current location information identifies a location of the user during the second time period;
selecting from a plurality of candidate personality types, based upon the historical social media information, a selected personality type associated with the user;
determining, based upon the current location information and the selected personality type, a candidate entertainment recommendation to potentially be provided to the user, wherein the candidate entertainment recommendation comprises a first recommendation to be present at a first venue;
determining, based upon the current social media information, whether the candidate entertainment recommendation should be provided to the user;
responsive to determining that the candidate entertainment recommendation should not be provided to the user;
determining, based upon the current location information and the selected personality type, an alternate entertainment recommendation be provided to the user, wherein the alternate entertainment recommendation comprises a second recommendation to be present at a second venue, the second venue being different from the first venue; and
providing to the user the alternate entertainment recommendation to be present at the second venue.

14. The system of claim 13, wherein:
each of the historical social media information and the current social media information comprises a social media network post by the user, a social media network status of the user, a social media network activity of the user, a social media network post by a person other than the user, a social media network status of a person other than the user, a social media network activity of a person other than the user, or a combination thereof;
the obtaining the historical social media information comprises obtaining the historical social media information from a social media network;
the obtaining the current social media information comprises obtaining the current social media information from the social media network; and
the historical social media information and the current social media information are obtained from the social media network by:
sending a social media information request to the social media network; and
receiving from the social media network, responsive to the sending of the social media information request, the historical social media information and the current social media information.

15. The system of claim 13, wherein:
the second time period is selected from a group comprising one minute, one hour, one day and one week;
the first time period is longer than the second time period; and
each of the first and second venues comprises a movie theater, a concert arena, a sports stadium, a sports arena, a restaurant, or a park.

16. The system of claim 13, wherein:
the current location information is obtained from a mobile end user device that is co-located with the user; and
the providing to the user the second recommendation comprises providing to the user the second recommendation via the mobile end user device that is co-located with the user.

17. A method comprising:
receiving from a social media network, by a processing system including a processor, historical social media information associated with a user, wherein the historical social media information relates to a first time period;

receiving from the social media network, by the processing system, current social media information associated with the user, wherein the current social media information relates to a second time period, wherein the first time period is earlier in time than the second time period, and wherein the first and second time periods do not overlap;

receiving, by the processing system, current location information associated with the user, wherein the current location information is received from a mobile end user device that is co-located with the user and wherein the current location information corresponds to a location of the user at a time that occurred during the second time period;

selecting, based upon the historical social media information, a selected personality type associated with the user, wherein the selected personality type is one of a plurality of candidate personality types;

determining, based upon the current location information and the selected personality type, a candidate venue recommendation for the user, wherein the candidate venue recommendation comprises a first recommendation to be present at a first venue;

determining, based upon the current social media information, whether the candidate venue recommendation should be provided to the user;

responsive to determining that the candidate venue recommendation should not be provided to the user;

determining, based upon the current location information and the selected personality type, an alternate venue recommendation for the user, wherein the alternate venue recommendation comprises a second recommendation to be present at a second venue, the second venue being different from the first venue; and providing to the user the alternate venue recommendation to be present at the second venue.

18. The method of claim 17, wherein:

the social media network comprises a plurality of social media networks, the plurality of social media networks comprises a first social media network and a second social media network;

the first social media network is distinct from the second social media network;

the historical social media information comprises first information received from the first social media network; and the current social media information comprises second information, distinct from the first information, received from the second social media network.

19. The method of claim 17, wherein:

the mobile end user device is a smartphone, a tablet, or any combination thereof;

the mobile end user device comprises a display; and the second recommendation is provided to the user via the display.

20. The method of claim 17, further comprising:

sending to the social media network, by the processing system, a first request for the historical social media information; and sending to the social media network, by the processing system, a second request for the current social media information;

wherein the receiving from the social media network the historical social media information is responsive to the sending of the first request; and wherein the receiving from the social media network the current social media information is responsive to the sending of the second request.

* * * * *